United States Patent Office 2,798,889
Patented July 9, 1957

2,798,889

MANUFACTURE OF AROMATICS

Hein Israel Waterman, Delft, Jan Willem Klinkenberg, Vlaardingen, and Jan Marinus Oelderik, Delft, Netherlands, assignors to Shell Development Company, New York, N. Y., a corporation of Delaware No Drawing. Application February 18, 1955,
Serial No. 489,263

Claims priority, application Netherlands
February 25, 1954

4 Claims. (Cl. 260—673)

The present invention relates to a process for the manufacture of aromatics, and particularly to a process of manufacturing higher boiling aromatics by the catalytic polymerization and dehydroaromatization of ethene.

It has been known to polymerize ethene with polymerization catalysts such as heteropoly acid catalysts, the principal products being higher boiling olefins, but such a process has heretofore not been applicable to the manufacture of aromatics. It has also been known to manufacture a gasoline fraction by reacting ethene in the presence of polymerization catalysts such as phosphoric acid, but in this process it has often been necessary to carry out the reaction also in the presence of dehydrogenation catalysts such as elemental nickel or nickel oxide in order to obtain aromatics in the product.

The principal object of the present invention is to provide an improved process for the manufacture of aromatics from normally gaseous olefins. A further object is to provide an improved process for the manufacture of aromatics boiling above the gasoline boiling range but below the lubricating oil boiling range by the polymerization of ethene in the presence of a heteropoly acid or acid salt thereof. Other objects will be readily apparent from the description and discussion of the invention.

It has now been discovered that aromatics boiling above the gasoline boiling range can be manufactured in high yields by the polymerization and dehydroaromatization of ethene in the presence of an acidic catalyst of a heteropoly acid, such as a heteropoly acid or acid salt thereof, under particular and critical conditions of temperature and pressure. The product of the process of the present invention and/or the aromatic fractions which can be separated therefrom are suitable as solvents, as starting materials for the manufacture of detergents by sulfonation, as starting materials in the manufacture of plastics, particularly synthetic textiles, and for many other uses.

The objects of the invention are accomplished by heating ethene to a temperature of above 200° C. up to about 350° C., under a total pressure of at least 50 atmospheres absolute, in the presence of a heteropoly acid or acid salt thereof. No other catalytic agent is necessary.

The above specified temperature and pressure ranges are essential to the process. If either the temperature is not greater than 200° C. or the pressure is below 50 atmospheres, aromatics in the boiling range between gasoline and lubricating oil will not be obtained in the desired substantial degree. Higher temperatures result in greater yields of aromatics, but if the temperature is above 350° C., the heteropoly acid or salt thereof will decompose. A high yield of aromatics together with a long catalyst life will be obtained especially in the temperature range from about 220° C. to 300° C., and a particularly preferred temperature is about 250° C.

Ethene can also be polymerized by the process of the invention in the presence of minor proportions of other gases and also in the presence of substantial or even preponderant amounts of paraffin diluents such as propane or pentane, as will be further described below. The total operating pressure in such cases should be at least 50 atmospheres absolute, but the partial pressure of ethene in such mixtures can be below 50 atmospheres. In general, increasing the operating pressure increases the yield of aromatics. Particularly effective operating pressures are in the range of 60 to 200 atmospheres.

Examples of heteropoly acids suitable for the practice of the invention are phospho-tungstic acid, phospho-molybdic acid, chromo-molybdic acid, phospho-tungstic-molybdic acid, phospho-vanadic acid, silico-tungstic acid, silico-molybdic acid, arseno-molybdic acid and boron-tungstic acid. Acid salts of these heteropoly acids are also suitable for use as catalysts for the present reaction, such as, for example, the chromium, beryllium, zinc, cobalt, aluminum, titanium, nickel, iron, sodium, barium, copper, mercury, arsenic, and lead salts of the above heteropoly acids.

The presence of a solid carrier for the catalyst and the nature of this carrier also greatly affect the course of the reaction. The aromatic yield can be considerably increased and even doubled by the presence of a carrier. Suitable carriers are silica gel, natural or synthetic alumina, aluminum silicate and pumice. Silica gel generally gives the highest yields. Oxides of silicon and aluminum are the preferred carriers. The weight ratio of catalyst to carrier is of importance. Weight ratios of catalyst to carrier between 10:90 and 50:50 are generally preferred. It is necessary for the carriers to be substantially free from alkaline components of the silicates, aluminates, or the like, from which they are prepared. Consequently, commercial silica gel or alumina should be pre-treated with acid, preferably diluted mineral acid. Also where the carriers are other synthetic or natural products a pre-treatment of the carrier with diluted acid often results in greater yields.

If during the reaction minor proportion of other lower boiling olefins are present in addition to ethene, these also take part in the reaction.

The reaction may be carried out either batchwise or continuously. In the case of a continuous process, suitable space velocities are from 1 to 10 liters of total feed (liquified basis) per liter of catalyst bulk volume per hour, but depending upon economic considerations higher or lower space velocities can be used. Generally, a space velocity sufficiently low to produce an ethene conversion of at least 30% will be desirable.

*Example I*

The starting material used was 95% pure ethene plus minor quantities each of hydrogen, nitrogen and oxygen. These minor constituents had no significant effect on the reaction.

Silico-tungstic acid was used as catalyst; it was prepared according to the method described in "Inorganic Syntheses," volume I, H. S. Booth, editor, page 129, New York, McGraw-Hill Book Co., Inc., 1939.

Silica gel and alumina were used as carriers. Before being used they were treated with 4 N HCl for three hours at ordinary temperature and then held at 150° C. for twenty-four hours.

The catalyst was applied to the carrier in the following manner: 1 part by weight of silico-tungstic acid was dissolved in a small amount of water and 4 parts by weight of carrier was submerged in this solution. The water was evaporated while the mixture was stirred at intervals. Finally the mixture was dried for 16 hours at a temperature of 110° C.–120° C. (Suitable drying temperatures lie between 110° C. and 300° C.)

The experiments were carried out in a rotating autoclave with capacity of 2 liters. 160 grams of the mixture of catalyst and carrier were introduced therein. The autoclave was then evacuated to a pressure of 20 mm. Hg and subsequently filled with ethene to a pressure of 55 atm. abs. The temperature was raised to the desired level in the course of half an hour (250 and 300° C., respectively), the pressure rising to approximately 150 atm. abs.

The beginning of polymerization could be observed from a drop in pressure. The reaction was continued until the pressure no longer dropped and this was the case after ½ to 1½ hours. The mixture was then allowed to cool to room temperature.

The yield of liquid product which was found on operating the autoclave was 57% at a reaction temperature of 250° C. with the use of alumina, and 74% at the same temperature with the use of silica gel.

The liquid product was fractionated by distillation. Distillation was first carried out at atmospheric pressure by means of a rectifying column, 120 cm. in height, which was filled with glass beads. The residue boiling above 214° C. (that is, above the boiling range of gasoline) was passed into a Claisen flask provided with a Vigreux column, 15 cm. in height, and distilled in vacuo.

The molecular weight (M), the refractive index ($n_D^{20}$) and the specific gravity ($d_4^{20}$) were determined of the various fractions distilled over under vacuum. The results are assembled in the following table. The physical properties show that these fractions, and particularly the higher ones, consisted largely of aromatics especially in the experiments in which silica gel was used as a carrier.

| Carrier and reaction temperature | Boiling range, ° C. | Percent by volume based on total liquid product | M | $n_D^{20}$ | $d_4^{20}$ |
|---|---|---|---|---|---|
| Al₂O₃, 250° C | 100-130/22.5 mm. Hg. | 4.0 | 193 | 1.4603 | 0.8277 |
|  | 130-170/22.5 | 12.5 | 219 | 1.4945 | 0.8773 |
|  | 170-200/22.5 | 11.5 | 239 | 1.5138 | 0.9055 |
|  | 160-213/2 | 9.5 | 272 | 1.5277 | 0.9288 |
| Al₂O₃, 300° C | 95-130/17 mm. Hg. | 7.0 | 192 | 1.4634 | 0.8289 |
|  | 130-170/16 | 20.0 | 220 | 1.4980 | 0.8820 |
|  | 170-207/15 | 9.0 | 261 | 1.5160 | 0.9096 |
| SiO₂, 250° C | 95-130/17.5 mm. Hg. | 5.0 | 200 | 1.4634 | 0.8293 |
|  | 130-170/17.5 | 19.5 | 227 | 1.5080 | 0.8942 |
|  | 170-214/17.5 | 12.5 | 265 | 1.5230 | 0.9193 |
| SiO₂, 300° C | 100-130/17 mm. Hg. | 3.0 | 187 | 1.4700 | 0.8371 |
|  | 130-170/17 | 20.0 | 207 | 1.5085 | 0.8925 |
|  | 170-220/17 | 10.5 | 227 | 1.5320 | 0.9257 |

Example II

A liquified, normally gaseous mixture consisting of 37.3 mol percent ethene and 62.7 mol percent propane was continuously injected into a catalyst-containing cylindrical reactor tube (500 mm. in length and 46 mm. in internal diameter) by a high pressure measuring pump of the plunger type. The space in the reactor tube above and below the catalyst bed was filled with glass beads. The temperature of the catalyst bed was measured by two thermocouples. The feed entered the reactor tube at the top and the reaction product left at the bottom. The product was run through two reflux coolers, one of which was maintained at 0° C. and the other at −70° C.

The catalyst consisted of 20% by weight of silico-tungstic acid and 80% by weight of silica gel, prepared in the manner described in Example I. The feed mixture was passed over the catalyst at a space velocity of 2 liters of liquid feed per liter of catalyst volume per hour. The operating pressure and temperature within the reaction tube were maintained at 200 atm. abs. and 230° C., respectively.

Under these conditions 403 cc. of liquid product was formed which on distillation yielded the following fractions:

| Boiling range in ° C. | Percent by vol. based on total liquid product | $n_D^{20}$ |
|---|---|---|
| 90-130° C./10 mm. Hg | 10.5 | 1.4780 |
| 130-170° C./10 | 19.0 | 1.5128 |
| 170-200° C./10 | 8.7 | 1.5270 |

The aromatic nature of these fractions is apparent from the refractive indices thereof.

Example III

A liquified, normally gaseous mixture consisting of 60 mol percent ethene, 5 mol percent propene and 35 mol percent propane was reacted in the reaction apparatus described in Example II, and again with a catalyst consisting of 20% by weight silico-tungstic acid and 80% by weight silica gel, prepared as in Example I. In this experiment the space velocity was 2.1 liters liquid feed per liter catalyst per hour and the operating pressure and temperature were 150 atm. abs. and 250° C., respectively.

After eight hours 305 cc. of liquid had been formed from ethene and propene. Fractional distillation of this liquid yielded the fractions characterized by the following figures. It appears from the refractive indices that the higher fractions were aromatic.

| Boiling range in ° C. | Percent by vol. based on total liquid product | $n_D^{20}$ |
|---|---|---|
| 90-130° C./9 mm. Hg | 10.0 | 1.4694 |
| 130-170° C./9 | 22.5 | 1.5122 |
| 170-200° C./9 | 7.5 | 1.5227 |

Example IV

Ethene was polymerized, using phospho-tungstic acid as catalyst. The temperature was 250° C., and the pressure at the beginning of the reaction was 150 atm. abs. For the rest, all the conditions were the same as in Example I. A liquid product was formed in a yield of 80% by weight. The fraction of this product which distilled above 185° C. at atmospheric pressure constituted 39% by volume of the total liquid product and had a refractive index $n_D^{20}$ of 1.5170.

It has been found that the useful life of the heteropoly acid catalysts in the process of the invention can be considerably extended when the ethene feed is diluted with a substantial proportion of a paraffin hydrocarbon, either a single compound or a mixture of such compounds. Lower boiling members of this class are preferred, especially those containing from 4 to 8 carbon atoms. Pentane is a particularly advantageous diluent. Such diluents take no part or no significant part in the polymerization and aromatization reactions directly. However, they make possible a more precise temperature control of the highly exothermic polymerization reaction by preventing an excessively rapid temperature rise at the beginning of the reaction. They also extend the catalyst life. The reason for this effect may possibly be the elimination of side reactions whereby resins are formed in the surface of catalyst or possibly the avoidance of local "hot spots" in the catalyst whereby the catalyst is decomposed. For best results, the diluent should be from 50 to 80 mol percent of the feed mixture.

Example V

These runs were made in the reaction apparatus described in Example II with feed mixtures consisting of ethene and pentane. The operating pressures and temperatures within the reaction tube were maintained at 140-160 atms. abs. and 220-250° C., respectively. The space velocities were 2.0-2.5 liters liquid feed per liter catalyst per hour.

Run No. 1 was made with the catalyst described in Examples II and III, and the feed was a mixture consisting of 1 mol of ethene and 4 mols of pentane. This feed was passed through the reactor for 6 hours, and after an 18 hour interval, continued again for an additional 5 hours. The ethene conversion, that is, the weight percent of total normally liquid product (excluding the pentane) based on weight of ethene in the feed, remained constant at 90% throughout the entire run.

Run No. 2 was made with a catalyst of the same composition and preparation as that of run No. 1, but here the feed was a mixture of ethene and pentane in a 1:1 mol ratio. This was passed through the reactor for 12 hours, and after a 12 hour interval continued again for an additional 6 hours. The ethene conversion remained constant at 85–90% throughout the entire run.

Run No. 3 was made with the same feed mixture as in run No. 2, but with a catalyst consisting of 10% by weight of silico-tungstic acid and 90% by weight of silica gel, but again prepared in the manner described in Example I. This run was continued for 4 hours, during which time the ethene conversion remained at 75%.

The reaction products of these three runs were essentially identical in properties. Fractions boiling above the boiling range of gasoline were as follows:

| Boiling range, °C. | Percent by vol. based on total liquid product | $n_D^{20}$ |
|---|---|---|
| 95–130/9 mm. Hg | 10.4 | 1.4710 |
| 130–170/9 | 20.8 | 1.5053 |
| 170–210/9 | 11.7 | 1.5226 |

These products differed very little from products obtained without pentane addition, although somewhat smaller quantities of more volatile (gasoline boiling range) material are produced. However, the conversion, and therefore, the net aromatic yield, is maintained at a high level for a longer period of time by the addition of pentane.

We claim as our invention:

1. A process for the manufacture of aromatics boiling between the boiling ranges of gasoline and lubricating oil which comprises contacting ethene with a catalyst selected from the group consisting of silico-tungstic acid and phospho-tungstic acid, supported on a solid carrier substantially free from alkaline components, the weight ratio of said catalyst to said solid carrier being from 10:90 to 50:50, said contacting being carried out at a temperature between 220° C. and about 300° C. and at a total pressure of at least 50 atmospheres absolute.

2. A process according to claim 1, wherein the solid carrier is silica gel.

3. A process according to claim 1, wherein the catalyst is silico-tungstic acid.

4. A process according to claim 1, wherein the catalyst is phospho-tungstic acid.

References Cited in the file of this patent

UNITED STATES PATENTS

| 2,237,460 | Thompson | Apr. 18, 1941 |
| 2,301,966 | Michel | Nov. 17, 1942 |
| 2,446,619 | Stewart et al. | Aug. 10, 1948 |

OTHER REFERENCES

Hackh's Chemical Dictionary, 3rd edition (1946), page 407. Copy available in Patent Office Library.

Inorganic Chemistry, 2nd edition (1952), pages 206–208, Emeleus et al. Copy available in Patent Office Library.